US010298354B2

(12) United States Patent
Kronestedt et al.

(10) Patent No.: US 10,298,354 B2
(45) Date of Patent: May 21, 2019

(54) DEFINING CELL COORDINATION GROUP TO WHICH INTERFERENCE MANAGEMENT TECHNIQUES SUCH AS COMP CAN BE APPLIED

(71) Applicant: TELEFONAKTIEBOLAGET LM ERICSSON (PUBL), Stockholm (SE)

(72) Inventors: Fredric Kronestedt, Bromma (SE); Lars Klockar, Rättvik (SE); Magnus Lundevall, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 33 days.

(21) Appl. No.: 15/501,910

(22) PCT Filed: Aug. 21, 2014

(86) PCT No.: PCT/IB2014/064010
§ 371 (c)(1),
(2) Date: Feb. 6, 2017

(87) PCT Pub. No.: WO2016/027131
PCT Pub. Date: Feb. 25, 2016

(65) Prior Publication Data
US 2017/0230131 A1   Aug. 10, 2017

(51) Int. Cl.
*H04B 7/024* (2017.01)
*H04J 11/00* (2006.01)
(Continued)

(52) U.S. Cl.
CPC .......... *H04J 11/0053* (2013.01); *H04B 7/024* (2013.01); *H04B 17/345* (2015.01);
(Continued)

(58) Field of Classification Search
CPC ..... H04W 28/18; H04W 48/16; H04W 36/20; H04B 7/024; H04B 17/318
See application file for complete search history.

(56) References Cited

U.S. PATENT DOCUMENTS 6,137,991 A      10/2000  Isaksson
9,848,362 B2 *  12/2017  Axmon ................ H04W 36/04
(Continued)

FOREIGN PATENT DOCUMENTS

EP          2496012 A1    9/2012
EP          2590445 A1    5/2013
WO       2012084035 A1    6/2012

OTHER PUBLICATIONS

LTE Encyclopedia, "LTE Network Infrastructure and Elements," retrieved Feb. 3, 2017, https://sites.google.com/site/lteencyclopedia/lte-network-infrastructure-and-elements#TOC-2.3-The-X2-Interface.
(Continued)

*Primary Examiner* — Melanie Jagannathan
(74) *Attorney, Agent, or Firm* — Patent Portfolio Builders PLLC

(57) ABSTRACT

The application relates to the selection of cells to form a cell coordination group for which interference management techniques such as COMP are to be applied. The cells to be selected to improve the performance of a UE in terms of throughput or delay are not necessarily the ones which are geographically the closest because in city environments shadowing effects of buildings exist. Thus, choosing the closest cells for coordinated interference management will not be a good solution in many cases. Hence, there is a need to develop another method and mechanism for more accurately generating a cell coordination group for interference management activities. This problem is solved by the application in that either the downlink interference toward the UE
(Continued)

from the neighboring cells is estimated or the neighbor cells listen for the UE and then predict the downlink interference. Furthermore, the algorithm starts with an initial list of cells comprising the most likely handover candidates. Furthermore, cells are eliminated if the interconnection link to the serving base station is not fast enough for the interference reducing algorithms.

20 Claims, 7 Drawing Sheets

(51) Int. Cl.
- *H04W 16/32* (2009.01)
- *H04W 36/00* (2009.01)
- *H04W 48/08* (2009.01)
- *H04W 84/04* (2009.01)
- *H04B 17/345* (2015.01)

(52) U.S. Cl.
CPC ....... *H04W 36/0083* (2013.01); *H04W 48/08* (2013.01); *H04W 16/32* (2013.01); *H04W 84/042* (2013.01)

(56) References Cited

U.S. PATENT DOCUMENTS

| | | | |
|---|---|---|---|
| 2005/0265222 A1* | 12/2005 | Gerlach | H04B 7/022 370/208 |
| 2011/0255486 A1* | 10/2011 | Luo | H04W 48/12 370/329 |
| 2012/0165064 A1 | 6/2012 | Koutsimanis et al. | |
| 2012/0315917 A1 | 12/2012 | Comeau et al. | |
| 2013/0265901 A1* | 10/2013 | Pedersen | H04W 16/14 370/252 |
| 2014/0213249 A1* | 7/2014 | Kang | H04W 28/18 455/434 |
| 2015/0011224 A1* | 1/2015 | Kompalli Chakravartula | H04W 36/0083 455/438 |
| 2015/0189568 A1* | 7/2015 | Stanze | H04B 7/0417 370/331 |
| 2015/0365865 A1* | 12/2015 | Belschner | H04W 36/20 455/436 |

OTHER PUBLICATIONS

Wikipedia, "C-RAN," retrieved Feb. 3, 2017, http://en.wikipedia.org/wiki/C-RAN.

International Search Report and Written Opinion dated Apr. 29, 2015 in related International Application No. PCT/IB2014/064010.

* cited by examiner

DEFINING CELL COORDINATION GROUP TO WHICH INTERFERENCE MANAGEMENT TECHNIQUES SUCH AS COMP CAN BE APPLIED

TECHNICAL FIELD

The present invention generally relates to networks, software and methods and, more particularly, to mechanisms and techniques for determining a cell coordination group for interference coordination techniques.

BACKGROUND

An explosion of computing devices, stationary and portable, is currently underway. These computing devices include, but are not limited to, smartphones, laptops, tablets, phablets, etc. Demand for these devices is made more acute by social media's rapid evolution, which encourages a need to communicate and be in contact with others. This creates continual competition among various manufacturers to generate better and faster computing devices.

However, an issue associated with this development that becomes more acute in dense urban locations is the poor cell coverage for small geographical pockets that are either in the shadow of a large building, or inside a large building, effects known in the field as "street canyon" and/or "building shadowing." To address the poor or lack of coverage in these pockets, the modern mobile telecommunication networks have started to deploy small cells, in addition to the traditional macro cells.

Such a heterogeneous telecommunication network 100 is schematically illustrated in FIG. 1, in which a macro cell 102 (only one macro cell is illustrated for simplicity) is located on a building 104 in a densely built up area 106. This area includes streets 108 on which high buildings 110 are located. Due to these high-rise buildings, there might be areas 120 that have poor or no signal from macro cell 102. Deploying another macro cell for these pockets of no or poor cell coverage is not efficient, both from a financial and a frequency bandwidth point of view. Thus, there is a trend to deploy a small cell 122 in or close to the area 120 having poor cell coverage.

Regarding the macro and small cells, a small cell may operate in the 10 m to 2 km range while a macro cell may operate in the tens of kilometers. However, note that there is no one agreed upon definition in the industry for the small and macro cell ranges and the numbers provided herein are for exemplary purposes.

However, by deploying many small cells to improve coverage, it leads to higher inter-cell interference levels as well as increased complexity in interference management features to achieve the best performance.

One way to implement a heterogeneous network is to use a base station architecture based on remote radio equipment and radio equipment controllers. For example, as illustrated in FIG. 2, macro cell 102 includes a base station 202 that has the remote radio equipment 204 including radio frequency generation unit 206 and, possibly, antenna elements 208 located in one place while the radio equipment controller 210, which typically includes baseband signal processing units, may be located in another place. The remote radio equipment 204 and radio equipment controller 210 are typically interconnected by fiber 212 carrying user plane information of in-phase and quadrature modulation data (digital baseband signals). Because of the fiber, the two locations can be far away from each other.

By using this approach, a centralized radio access network (C-RAN) 220 with common baseband units 210 for multiple base stations 202' to 202" can be used for a large number of macro and small cells covering a larger geographical area. With the C-RAN 220, inter-cell interference can be efficiently managed through interference mitigation features, such as Coordinated Multi-Point (CoMP) for reception and transmission. Note that the main idea behind CoMP is as follows: when user equipment (UE) is in the cell-edge region, it may be able to receive signals from multiple cell sites and the UE's transmission may be received at multiple cell sites regardless of the system load. Thus, if the signals transmitted from the multiple cell sites are coordinated, the downlink performance can be increased significantly. Further algorithms may be used for interference management when the macro and small cells use the same baseband units.

Other interference coordination techniques may be used when macro and small cells use different baseband units (i.e., radio equipment controllers). In this case, there need to be a short interconnecting delay and high transport capacity on the X2 interface (e.g., the fiber 212) or other similar interface between the baseband units.

However, a common problem with applying the existing interference coordination techniques to the various implementations of heterogeneous networks is the following. The existing interference techniques manage the multiple cells (macro and small) by using coordination, i.e., identification of the cells that are responsible for the highest amount of interference. In other words, for a given cell in the telecommunication network, the existing interference techniques need to determine and group those neighbor cells that generate the largest amount of interference. Thus, these techniques require (i) that the macro and small cells share the same radio equipment controller or (ii) there is a fast interconnect between radio equipment controllers when separate baseband units are deployed.

However, there is a practical limit on the number of remote radio equipment that can be connected to the same radio equipment controller or a group of radio equipment controllers. Also, the delay between coordinated cells needs to be below a limit or otherwise the coordination cannot be efficient. For example, a signal copy arriving outside a cyclic prefix in Long Term Evolution (LTE) is treated as interference by the receiver. There can also be a limit regarding the number of connections between the radio equipment controller and the multiple cells due to hardware and/or software limitations (processing power, memory, interconnection interface speed etc.).

A problem is thus to determine what remote radio equipment 204 (used for macro and small cell areas) that shares the same baseband unit 210 should belong to a same cell coordination group to benefit from CoMP and other interference management techniques. If the heterogeneous network has remote radio equipment 204 that do not share the baseband unit 210, then, the problem is what baseband units should belong to the same cell coordination group to benefit the interference management.

As now discussed, the existing methods for generating the cell coordination group have their own limitations. Such a method needs to identify the cells that generate a lot of interference to maximize the efficiency of the interference management. This identification is difficult in city environments due to e.g., street canyon and/or building shadowing effects as discussed with regard to FIG. 1. The geographically closest cell may not be the most interfering cell. To illustrate this concept, FIG. 3 shows a heterogeneous network 300 having macro cells 302 and small cells 304. Small cells 304 are connected by a line to the macro cell that generates the most downlink interference. In many cases, this is not the closest (in term of geographical distance) macro cell. Solid lines 310 are used when the most interfering macro cell also is the closest one and dash lines 312 otherwise. Dash lines 312 are dominating the picture, meaning that the majority of the small cells does not receive the strongest interference from the geographically closest macro cell.

Thus, choosing the closest cells for coordinated interference management will not be a good solution in many cases. Hence, there is a need to develop another method and mechanism for more accurately generating a cell coordination group for interference management activities.

SUMMARY

As the telecommunication networks become more complex by using more types of cells, there is the potential to coordinate groups of cells for reducing the inherent interference that appear between the cells. However, the existing coordination processes need to know the cell coordination group of a given cell in order to apply interference reducing methods. Present techniques for determining the cell coordination group fails, as noted above. Thus, there is a need for a new cell coordination group generation technique.

According to one embodiment, there is a method for forming a cell coordination group in a telecommunication network. The method includes a step of obtaining, for a serving cell, a neighbor cell list indicative of neighbor cells of the serving cell; a step of selecting a user equipment connected to the serving cell; a step of estimating downlink interference of the user equipment for the neighbor cells or a path loss of the user equipment for each neighbor cell; and a step of grouping the serving cell with selected neighboring cells to form a cell coordination group. The selected neighboring cells are selected based on the estimated downlink interference or the path loss.

According to another embodiment, there is a node in a telecommunication network that includes a first module configured to obtain, for a serving cell, a neighbor cell list indicative of neighbor cells of the serving cell; a second module configured to select a user equipment connected to the serving cell; a third module configured to estimate downlink interference of the user equipment for the neighbor cells or a path loss of the user equipment for each neighbor cell; and a fourth module configured to group the serving cell with selected neighboring cells to form a cell coordination group. The selected neighboring cells are selected based on the estimated downlink interference or the path loss.

Thus, it is an object to overcome some of the deficiencies discussed in the previous section and to provide a method and node for generating a cell coordination group that is more accurate. One or more of the embodiments discussed herein advantageously provides such a mechanism.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a heterogeneous telecommunication network. However, the embodiments discussed herein are not limited to heterogeneous telecommunication networks, but they may be applied to other types of networks, for example, a traditional network that includes only macro cells or a network that includes only small cells.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments or claims.

According to an embodiment, there is a method for identifying and grouping of cells (depending on their configuration, identifying the remote radio units or radio equipment controllers) that need to cooperate for interference management purposes. The method may be executed in a network node, e.g., base station, radio network controller, radio equipment controller or other node. The grouping may be based on cell traffic statistics, path loss, signal strength, delay and transport capacity.

In one embodiment, the method determines neighbor cells having interconnecting transport delay below a pre-determined limit and transport capacity above another predetermined limit to a serving cell. Then, various measurements for downlink interference and/or path loss for the neighbor cells are performed, and, based on these measurements, the serving cell and a selected number of neighbour cells are grouped together for interference management purposes. The neighbour cells with highest interference and/or path loss are selected, in order of level of interference/path loss, for the group until the maximum number of cells (due to hardware and/or software limitation) that can cooperate for coordination is reached.

Figure 4:
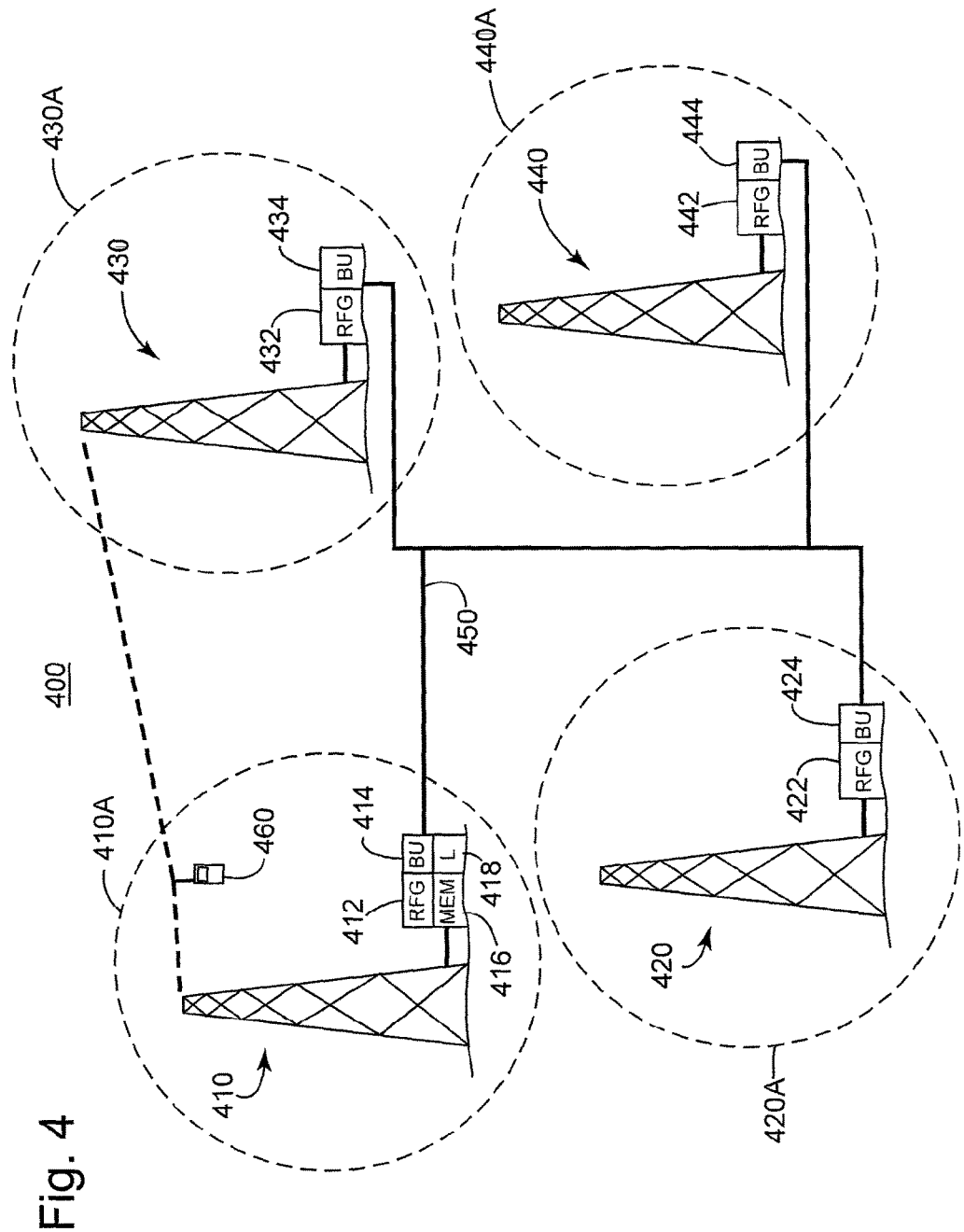
FIG. 4 illustrates a heterogeneous telecommunication network in which the base stations have baseband units connected by fiber to each other.

According to an embodiment illustrated in FIG. 4, a telecommunication network 400 includes multiple base stations 410, 420, 430, and 440 (only four shown for simplicity) distributed over an area. Note that each base station is associated with a corresponding cell area, which in this case, are cell areas 410A, 420A, 430A and 440A. In the following, the term "base station" is sometimes interchangeably used with the term "cell" although they have different meanings. Each base station includes a radio frequency generation (RFG) unit 412, 422, 432 and 442 and a baseband unit 414, 424, 434 and 444. The baseband units 414, 424, 434 and 444 are configured to communicate among them via corresponding cables 450. Because each base station has its own baseband unit, a C-RAN is not practical. This is different from the embodiment illustrated in FIG. 2, in which same baseband units 210 are shared by base stations 204 to 204". However, the methods discussed herein equally apply to the configurations shown in FIGS. 2 and 4.

Figure 5:
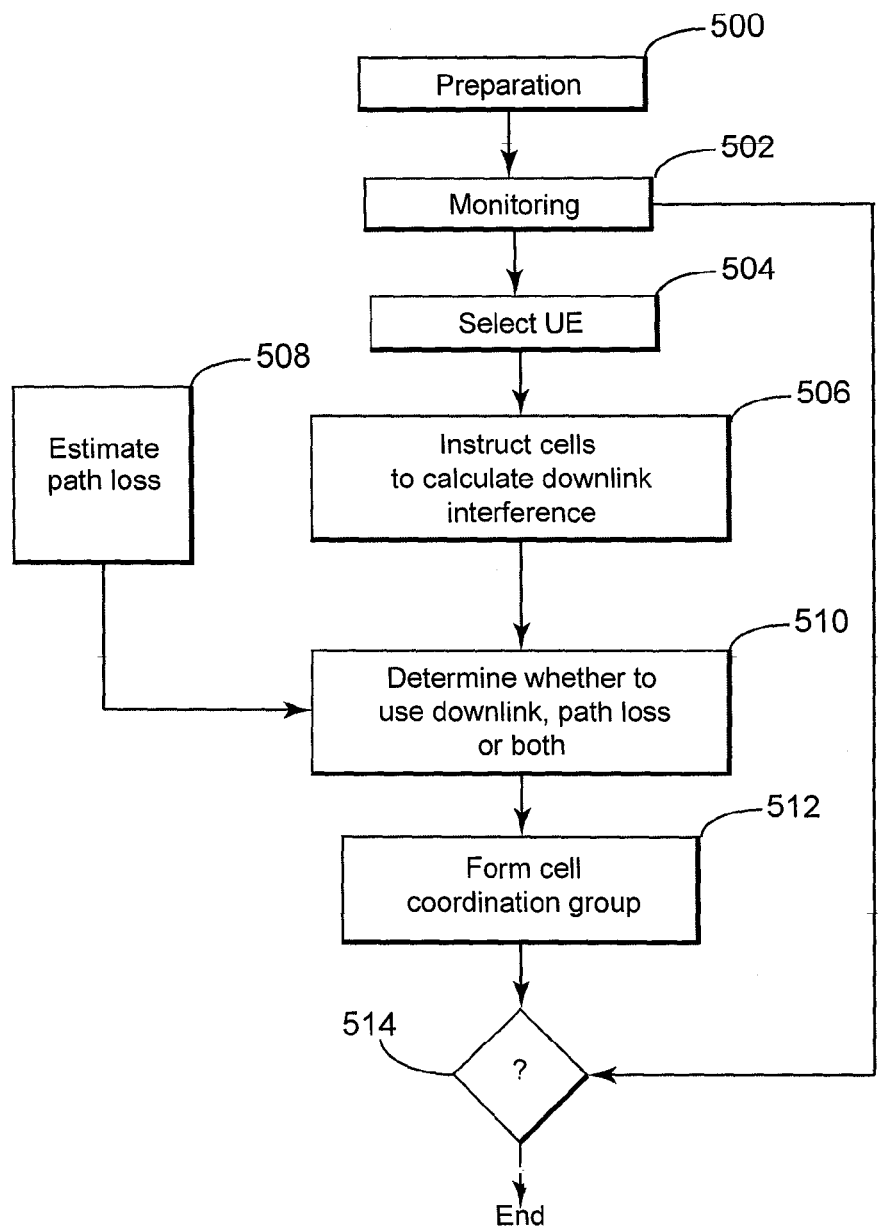
FIG. 5 illustrates a method for forming a cell coordination group in a telecommunication network.

One method is illustrated in FIG. 5 and includes a preparation step 500. Considering that preparation step 500 is applied to base station 410, i.e., the serving cell, it includes determining the most likely handover candidates based on the neighbour cell list and handover statistics (history) in the serving cell. This means that base station 410 stores (in a memory 416) or has access to a list 418 of the neighbours, e.g., base stations 420, 430 and 440, and determines, based on prior data indicative of how many of the UEs from the serving cell were handover to the neighbour cells, the most likely handover candidates, e.g., base stations 420 and 430. In one application, the handover statistics can be, for example, the number of handovers from the serving cell to each one of the neighbour cells in the neighbour cell list at a busy hour of the day. The cell with the highest count is most likely the cell that users will handover to.

Note that one or more of the steps discussed next may be omitted and they do not have to be performed by each base station. In other words, it is possible that only base stations 410 and 440 implement these steps while base stations 420 and 430 do not. The base stations that are selected to implement the method of FIG. 5 may be determined based on, for example, network operator's experience, historical data, number of UEs experiencing poor performance, etc. Also, the steps to be discussed next do not have to be performed in the order illustrated in FIG. 5. Variations of the order presented in FIG. 5 may be implemented by those skilled in the art.

Figure 1:
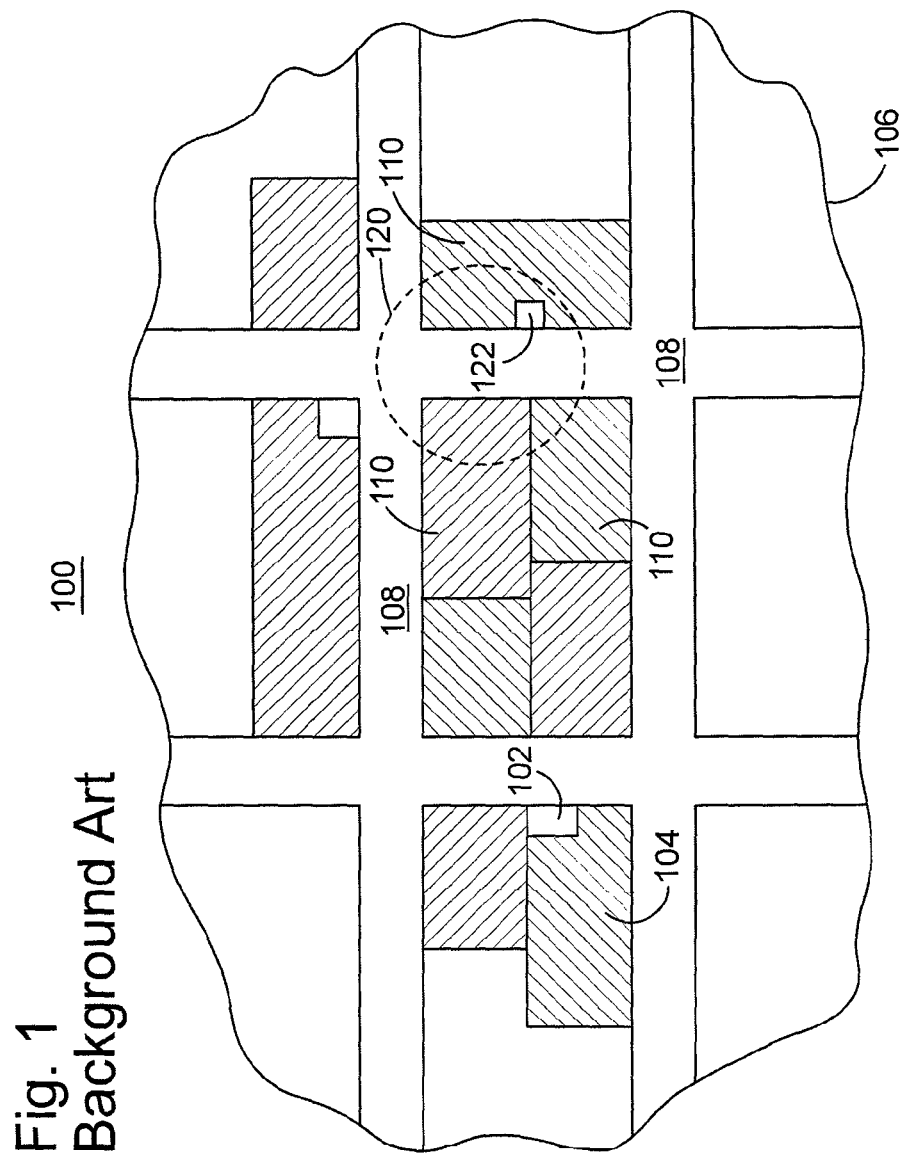
FIG. 1 is a schematic diagram of a heterogeneous telecommunication network.
Figure 2:
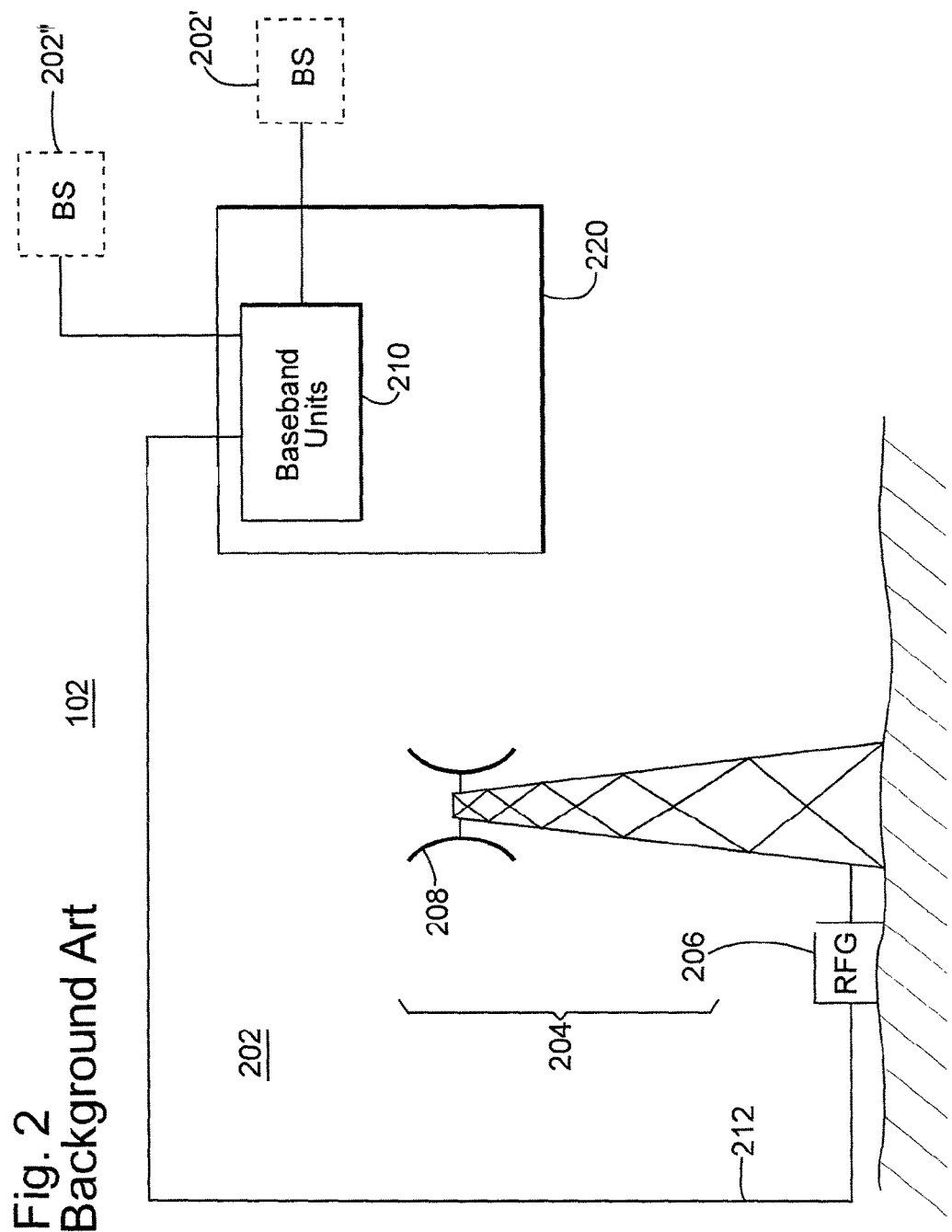
FIG. 2 is a schematic diagram of a macro cell.
Figure 3:
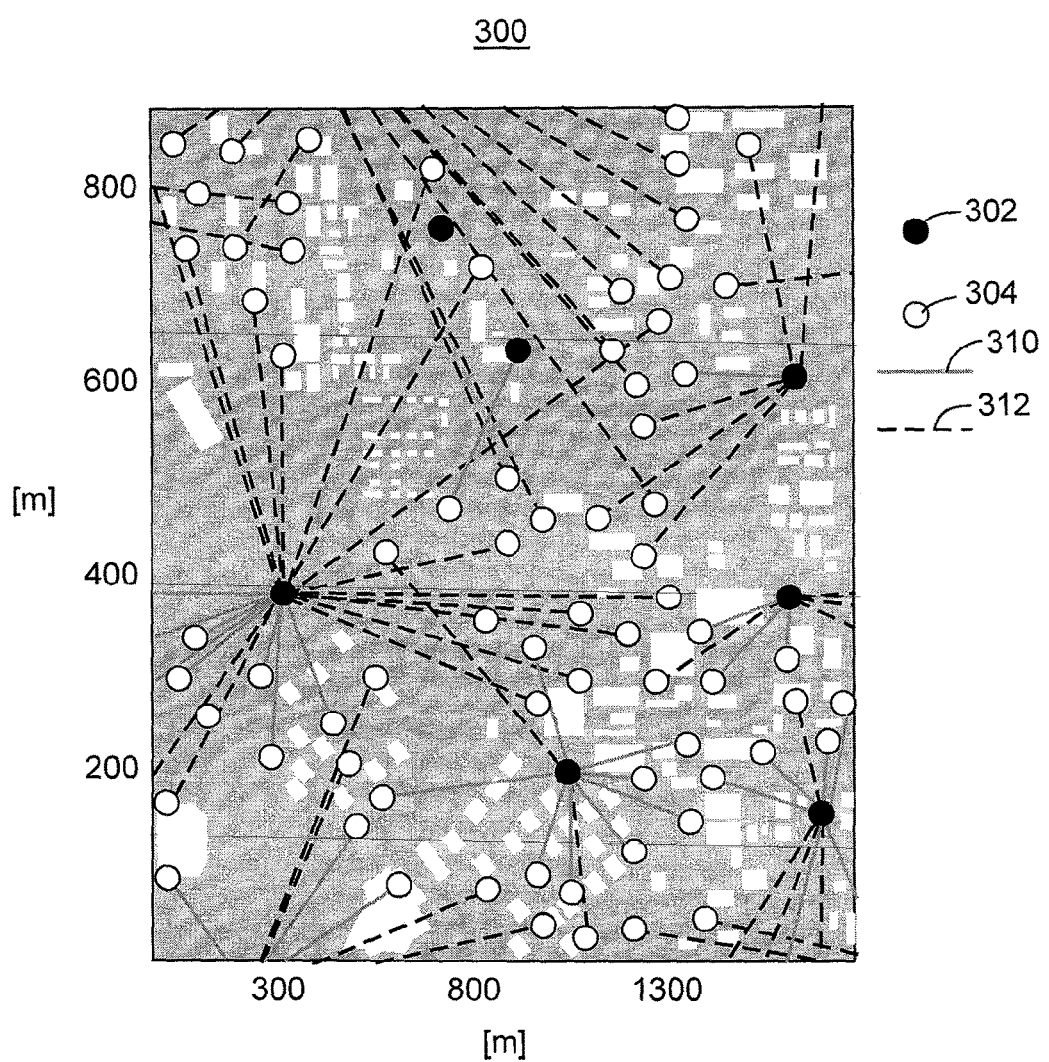
FIG. 3 illustrates that maximum cell interference is not always related to geographical proximity in a heterogeneous telecommunication network.

Next, the serving cell 410 (in one application, more cells perform this step not only the serving cell) monitors in step 502 transport parameters between its baseband unit 414 and the neighbour cells' baseband units 424, 434 and 444 along communication cables 450 to determine whether the transport capacity fulfils delay requirements, i.e., transmission delays below a first predetermined threshold and transport capacity above a second predetermined threshold between each base station and the serving cell. The first and second predetermined thresholds may depend on the configuration of the base station, the type of equipment used for controlling the radio equipment, the type of telecommunication network, etc. The monitoring step 502 for a network architecture as illustrated in FIG. 4 (i.e., with radio equipment controllers for the various base stations geographically separated) is desired because delayed or low capacity communications between the baseband units prevent the interference reducing algorithms to be applicable. If a network architecture as illustrated in FIG. 2 is used, the monitoring step may be performed once, at the beginning of the procedure, or this step may be skipped.

In one optional step, the serving cell continuously determines the neighbour cells that fulfil delay requirement and have a transport capacity above a predetermined limit. If the serving cell determines that one or more of the neighbour cells fail to fulfil these requirements, those cells are removed from the candidate neighbour cells. If a dedicated transport link is used, this step can be incorporated in the preparation step 500.

In step 504, a UE 460 is selected for further signal processing. UE 460 is physically located within serving cell 410A. The selection is based on a detection of a service performance below a given threshold. For example, one of the service performance factors may be throughput or delay. Thus, if low throughput or high delay is determined comparative to the given threshold, that is indicative of the service performance. Those skilled in the art would recognize that other factors or a combination of factors may be used for determining the service performance.

Once the UE 460 has been selected to have service performance below the given threshold, the method instructs in step 506, each cell of the set of handover cell candidates 420, 430 and 440 from step 500, to estimate/calculate/obtain its downlink interference associated with the selected UE 460. For example, this step may be implemented such that the neighbor cells listen if they can "hear" the UE 460 and then predict downlink interference they generate based on power, traffic load and received power from UE 460. Other methods for determining downlink interference are known, and some of them are disclosed, for example, in U.S. Pat. No. 6,137,991, the entire content of which is incorporated herein by reference. The downlink measurement is a good representation of the downlink interference from neighbors if the traffic load of the neighbor cells is known.

The set of neighbor cells 420, 430 and 440 that are also handover cell candidates may be ordered to estimate, in an optional step 508, path loss from the selected UE to each of the neighbor cells 420, 430 and 440. Note that the downlink measurement from step 506 can be used for estimating path loss to a neighbor cell. Alternatively, uplink and/or downlink signal strength may be measured and path loss and/or downlink interference may be estimated based on the measured signal strength. This alternative may be preferred because estimating the signal strength in uplink is easy, e.g., just measure the received signal from the radio base station and this is a direct measure of the path loss toward the UE from the radio base station. More specifically, in one application, the UE may measure downlink signal strength of neighbors for handover purposes. These measurements may be then sent to the serving base station, from which path loss and downlink interference can be estimated using knowledge of the radio base station's used power and cell traffic information, etc. In another application, the serving and neighbor radio base stations may measure the uplink signal strength of the selected UE. The uplink signal strength is a direct measure of path loss. Downlink interference can be estimated from uplink signal strength using knowledge of the radio base station's used power and cell traffic information, etc. In other words, each of steps 506 and 508 may be modified to measure signal strength (uplink or downlink or both) and to estimate path loss and/or downlink interference. Thus, those skilled in the art would understand that steps 506 and 508 may be replaced by a step of measuring signal strength (uplink or downlink or both) followed, optionally, by a step of estimating the path loss, or the downlink interference or both.

If there are limited measurement capabilities in the network 400, the above noted estimations/calculations associated with steps 506 and 508 may be performed in cell priority order based on the handover statistics noted in step 500, i.e., the cell with the highest probability of handover is calculated first and so on. Note that in one embodiment some or all of the estimations/calculations performed in steps 506 and/or 508 may be performed by the UE. Thus, the UE service performance threshold can be based on path loss and/or downlink performance. The decision whether to use only the path loss performance, only the downlink performance or a combination of the two may be made in step 510 or prior to preparation step 500. If the decision is made in step 510, it may be implemented as now discussed. In one application, it is determined whether the UE experiences poor uplink or downlink service performance. If poor uplink service performance is determined, then path loss or uplink signal strength is used for grouping. If poor downlink service performance is determined, then downlink interference is used for grouping. If the decision is made prior to step 500, for example, based on historic data, the software supporting this method is programmed to not execute step 508 or to execute step 508 instead of step 506 or to execute both of them. In another application, the path loss may be used for grouping to apply a downlink interference management technique when a UE experiences bad downlink service performance.

In step 512, the cell coordination group is formed by including the serving cell and the neighbour cells with the highest interference and/or highest path loss (as estimated in steps 506 and 508). Because the number of members of the cell coordination group may be limited due to hardware and/or software features as discussed above, the number of neighbour cells that are part of the group is selected from the highest to lowest in terms of interference and/or path loss.

In one application, the process advances to step 514, where a decision is made whether to return to step 502 or to end the process. If the decision is made to return to step 502, a consequence of the monitoring step is that the number of neighbor cells may increase or decrease. The method returns to step 502 until UE 460 has completed its session, leaves the serving cell 410 or its performance becomes better than the threshold.

The entire method may be repeated for another UE for determining its cell coordination group. In one application, the UEs in the serving cell are addressed sequentially while in another application the UEs are addressed simultaneously. The approach depends on the amount of calculating capabilities present in the base stations and the node hosting the method of FIG. 5. In one application it is possible that some of the UEs present in the serving cell are addressed at the same time. Note that if interconnect transport characteristics are violated for a neighbour cell, the neighbour cell may be excluded from the cell coordination group.

Figure 6:
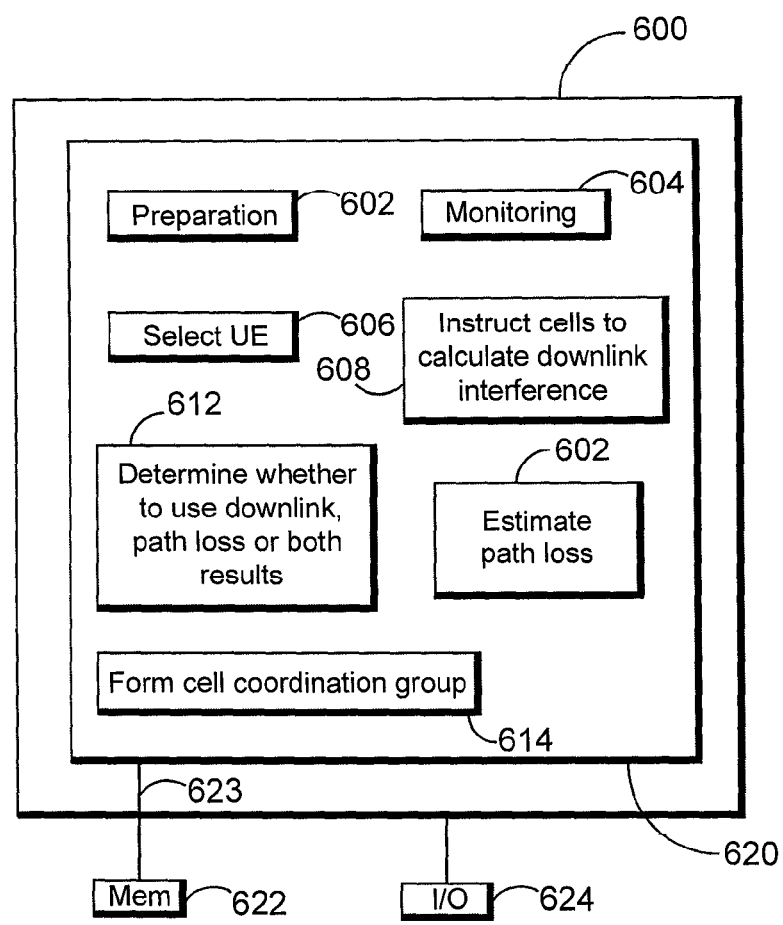
FIG. 6 is a schematic diagram of a node and associated modules that execute various functions as noted in FIG. 5.

The above discussed methods may be implemented in software, hardware or a combination of the two in a node of the telecommunication network. They may be implemented in part or all of the nodes of the telecommunication network. A node may be considered any part or sub-part of the telecommunication network. They also may be implemented at least in telecommunication networks having base stations structured as illustrated in FIGS. 2 and/or 4. If the methods are implemented in software, one or more modules may be designed to accomplish the steps illustrated in FIG. 5. Thus, FIG. 6 shows a node (belonging to a telecommunication network) 600 having modules 602 to 614 that execute in software, when run on the node, the functions noted in steps 500 to 512. Modules 602 to 614 are labelled similar to the functions noted in steps 500 to 512 of FIG. 5 for a simple identification of each function. Node 600 may also include a processor 620 that runs one or more of modules 602 to 614, a data storage unit 622 (for storing, for example, the neighbour cell list) connected through a bus 623 to processor 620 and an input/output unit 624 that links the node to one or more base stations or other equipment of the telecommunication network. In one embodiment, node 600 is one of the base stations. Note that FIG. 6 shows the modules not connected to each other as they may be software representations. However, the modules may be connected to each other, for example, in the order shown in FIG. 5. Processor 620 may be configured to implement each step of the method illustrated in FIG. 5.

Figure 7:
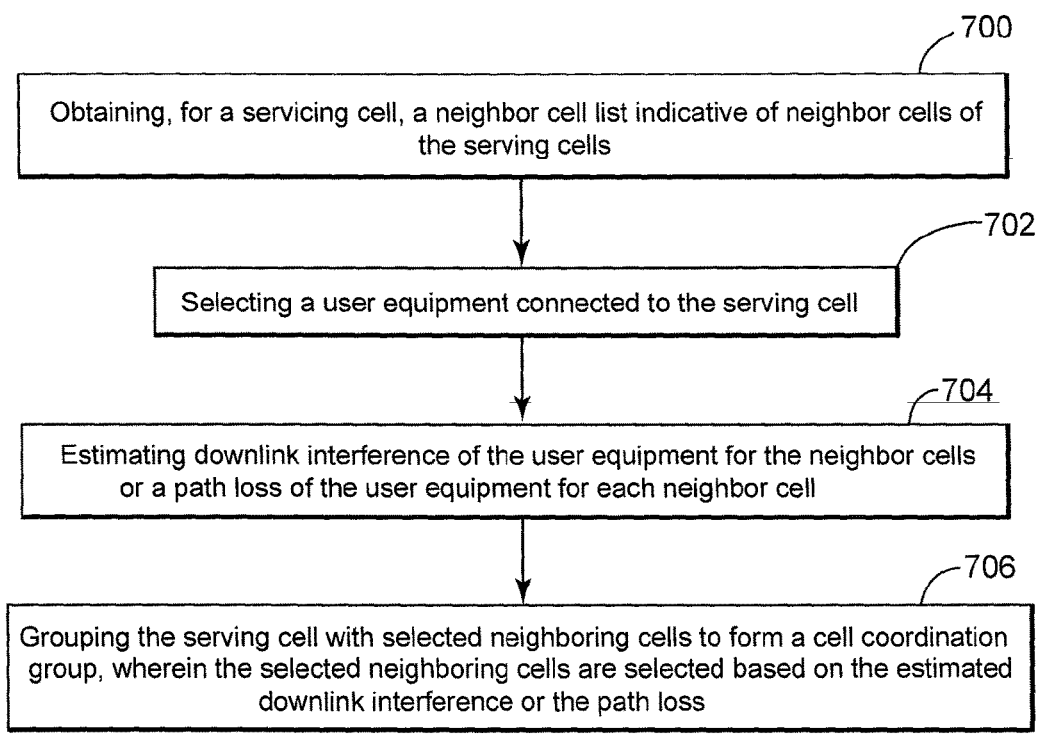
FIG. 7 if a flowchart of a method for forming a cell coordination group in a telecommunication network.

According to an embodiment illustrated in FIG. 7, a method for forming a cell coordination group in a telecommunication network is now discussed. The method includes a step 700 of obtaining, for a serving cell, a neighbor cell list indicative of neighbor cells of the serving cell, a step 702 of selecting a user equipment connected to the serving cell, wherein the selection of the user equipment is based on service performance provided by the serving cell to the user equipment, a step 704 of estimating downlink interference of the user equipment for the neighbor cells or a path loss of the user equipment for each neighbor cell, and a step 706 of grouping the serving cell with selected neighboring cells to form a cell coordination group, wherein the selected neighboring cells are selected based on the estimated downlink interference or the path loss. Note that it is possible to measure signal strength and then to estimate downlink interference and/or path loss based on the measured signal strength.

The disclosed embodiments provide a telecommunication network node and method for grouping various cells in a cell coordination group that is used by the interference management unit of the network to reduce the interference between the cells. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software or firmware tangibly embodied in a computer-readable storage medium for execution by a specifically programmed computer or processor.

What is claimed is:

1. A method for forming a cell coordination group in a telecommunication network, the method comprising:
obtaining, for a serving cell, a neighbor cell list indicative of neighbor cells of the serving cell;
selecting a user equipment connected to the serving cell, wherein the selection of the user equipment is based on service performance provided by the serving cell to the user equipment;
estimating downlink interference of the user equipment for the neighbor cells or a path loss of the user equipment for each neighbor cell; and
grouping the serving cell with selected neighboring cells to form a cell coordination group, wherein the selected neighboring cells are selected based on the estimated downlink interference or the path loss.

2. The method of claim 1, wherein the selected neighboring cells have the highest estimated downlink interference from the neighboring cells.

3. The method of claim 1, wherein the selected neighbor cells are selected from the neighbor cell list based on how likely a user terminal from the serving cell is handed over to the selected neighbor cells.

4. The method of claim 1, wherein the step of grouping comprises:
selecting the selected neighboring cells based on the estimated downlink interference and the path loss.

5. The method of claim 1, wherein the step of estimating includes estimating the downlink interference toward the user equipment from the neighbor cells.

6. The method of claim 1, wherein the step of estimating comprises:
listening in a neighbor cell for the user equipment and then predicting the downlink interference based at least on one of power, traffic load and received power from the user equipment.

7. The method of claim 1, further comprising:
monitoring the neighbor cells whether an interconnection link among them has a transport delay below a first threshold and a transport capacity above a second threshold, wherein the first threshold is different from the second threshold.

8. The method of claim 7, further comprising:
removing a neighbor cell from the neighbor cells if the transport delay is below the first threshold or the transport capacity is above the second threshold.

9. The method of claim 1, wherein the cell coordination group has a maximum number of members dictated by software and/or hardware limitations associated with the telecommunication network.

10. The method of claim 1, wherein the service performance is determined based on at least one of low throughput or high time delay.

11. The method of claim 1, further comprising:
selecting another user equipment;
estimating downlink interference of the another user equipment for the neighbor cells or a path loss of the another equipment; and
grouping the serving cell with other selected neighbor cells to form another cell coordination group, wherein the other selected neighbor cells are selected based on the estimated downlink interference or the path loss of the another user equipment.

12. The method of claim 1, further comprising:
applying an interference managing algorithm for the user equipment only to the selected neighbor cells from the cell coordination group.

13. A node in a telecommunication network, the node comprising:
a processor, where the processor is configured to:
obtain, for a serving cell, a neighbor cell list indicative of neighbor cells of the serving cell;
select a user equipment connected to the serving cell, wherein the selection of the user equipment is based on service performance provided by the serving cell to the user equipment;
estimate downlink interference of the user equipment for the neighbor cells or a path loss of the user equipment for each neighbor cell; and
group the serving cell with selected neighboring cells to form a cell coordination group, wherein the selected neighboring cells are selected based on the estimated downlink interference or the path loss.

14. The node of claim 13, wherein the selected neighboring cells have the highest estimated downlink interference from the neighboring cells.

15. The node of claim 13, wherein the selected neighbor cells are selected from the neighbor cell list based on how likely a user terminal from the serving cell is handed over to the selected neighbor cells.

16. The node of claim 13, wherein the processor is further configured to estimate the downlink interference toward the user equipment from the neighbor cells.

17. The node of claim 13, wherein the selected neighboring cells are selected based on the estimated downlink interference and the path loss.

18. A non-transitory computer readable medium including computer executable instructions, wherein the instructions, when executed by a computer, implement a method for forming a cell coordination group in a telecommunication network, the medium comprising instructions for:
obtaining, for a serving cell, a neighbor cell list indicative of neighbor cells of the serving cell;
selecting a user equipment connected to the serving cell, wherein the selection of the user equipment is based on service performance provided by the serving cell to the user equipment;
estimating downlink interference of the user equipment for the neighbor cells or a path loss of the user equipment for each neighbor cell; and
grouping the serving cell with selected neighboring cells to form a cell coordination group, wherein the selected neighboring cells are selected based on the estimated downlink interference or the path loss.

19. The medium of claim 18, wherein the selected neighboring cells have the highest estimated downlink interference from the neighboring cells.

20. The medium of claim 18, wherein the selected neighbor cells are selected from the neighbor cell list based on how likely a user terminal from the serving cell is handed over to the selected neighbor cells.

* * * * *